(12) United States Patent
Kayano

(10) Patent No.: US 12,013,625 B2
(45) Date of Patent: Jun. 18, 2024

(54) PROJECTION LENS AND PROJECTION APPARATUS

(71) Applicant: FUJIFILM Corporation, Tokyo (JP)

(72) Inventor: Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 391 days.

(21) Appl. No.: 17/459,671

(22) Filed: Aug. 27, 2021

(65) Prior Publication Data

US 2021/0389649 A1 Dec. 16, 2021

Related U.S. Application Data

(63) Continuation of application No. PCT/JP2020/002182, filed on Jan. 22, 2020.

(30) Foreign Application Priority Data

Feb. 28, 2019 (JP) ................. 2019-036579

(51) Int. Cl.
*G03B 21/14* (2006.01)
*G02B 7/02* (2021.01)
(Continued)

(52) U.S. Cl.
CPC ........... *G03B 21/142* (2013.01); *G02B 7/021* (2013.01); *G02B 7/182* (2013.01); *G02B 13/16* (2013.01);
(Continued)

(58) Field of Classification Search
None
See application file for complete search history.

(56) References Cited

U.S. PATENT DOCUMENTS

2006/0181786 A1 8/2006 Chiang
2007/0076309 A1 4/2007 Shimizu et al.
(Continued)

FOREIGN PATENT DOCUMENTS

CN 1940616 A 4/2007
CN 101403842 A 4/2009
(Continued)

OTHER PUBLICATIONS

International Preliminary Report on Patentability for International Application No. PCT/JP2020/002182, dated Jan. 13, 2021, with an English translation.
(Continued)

*Primary Examiner* — Bao-Luan Q Le
(74) *Attorney, Agent, or Firm* — Birch, Stewart, Kolasch & Birch, LLP

(57) ABSTRACT

A projection lens is configured to be attached to a housing of a projection apparatus having an electro-optical element. The projection lens includes a first holding portion that holds a first optical system disposed along a first optical axis through which light from the housing passes, a first reflection portion that bends light having the first optical axis into light having a second optical axis, a second holding portion that holds the first reflection portion, and a second holding portion fixing mechanism that fixes the second holding portion to the first holding portion. By weakening a fixing force of the second holding portion fixing mechanism, the second holding portion can be shifted relative to the first holding portion.

16 Claims, 11 Drawing Sheets

(51) Int. Cl.

| | |
|---|---|
| *G02B 7/182* | (2021.01) |
| *G02B 13/16* | (2006.01) |
| *G02B 17/08* | (2006.01) |
| *G03B 21/00* | (2006.01) |
| *G03B 21/28* | (2006.01) |
| *G02B 5/08* | (2006.01) |

(52) U.S. Cl.
CPC .............. *G02B 17/08* (2013.01); *G03B 21/28* (2013.01); *G02B 5/0808* (2013.01); *G03B 21/008* (2013.01)

(56) References Cited

U.S. PATENT DOCUMENTS

| | | |
|---|---|---|
| 2009/0091830 A1 | 4/2009 | Ozaki et al. |
| 2018/0217489 A1 | 8/2018 | Kuroda |
| 2019/0086783 A1 | 3/2019 | Kuroda |
| 2019/0101816 A1 | 4/2019 | Kuroda |
| 2019/0219915 A1 | 7/2019 | Kayano |
| 2020/0050096 A1 | 2/2020 | Kuroda |
| 2021/0247598 A1 | 8/2021 | Kuroda |

FOREIGN PATENT DOCUMENTS

| | | | |
|---|---|---|---|
| JP | 63-65414 A | | 3/1988 |
| JP | 2006-330410 A | | 12/2006 |
| JP | 2007-94242 A | | 4/2007 |
| JP | 2013-3303 A | | 1/2013 |
| JP | 2017-15146 A | | 1/2017 |
| JP | 2017169903 A | * | 9/2017 |
| JP | 6378448 B2 | | 8/2018 |
| JP | 2019-2969 A | | 1/2019 |
| JP | 2019002969 A | * | 1/2019 |
| WO | WO2018/055963 A1 | | 3/2018 |
| WO | WO 2018/055964 A1 | | 3/2018 |

OTHER PUBLICATIONS

International Search Report for International Application No. PCT/JP2020/002182, dated Mar. 3, 2020, with an English translation.
Japanese Office Action dated Feb. 22, 2022 for Application No. 2019-036579 with an English translation.
Chinese Office Action and Search Report for corresponding Chinese Application No. 202080017182.7, dated Nov. 2, 2022, with English translation.
Chinese Office Action and Search Report for corresponding Chinese Application No. 202080017182.7, dated Apr. 5, 2023, with English translation.

* cited by examiner

PROJECTION LENS AND PROJECTION APPARATUS

CROSS-REFERENCE TO RELATED APPLICATIONS

This application is a continuation application of International Application No. PCT/JP2020/002182, filed on Jan. 22, 2020, which is incorporated herein by reference in its entirety. Further, this application claims priority from Japanese Patent Application No. 2019-036579, filed on Feb. 28, 2019, the disclosure of which is incorporated by reference herein in its entirety.

BACKGROUND

Technical Field

The technology according to the present disclosure relates to a projection lens and a projection apparatus.

Related Art

In recent years, a projector in which a liquid crystal display element and an image formation panel (electro-optical element), such as a DMD (Digital Micromirror Device), are mounted is popular and has performance that has been improved. In particular, with an improvement in the resolution of the image formation panel, an improvement in the resolution performance of a projection optical system (a projection lens) is also desired.

Such a projection lens is demanded to be downsized in consideration of increasing freedom in setting a distance to a screen and installation in an indoor space and is also demanded to ensure optical performance, such as a wide angle.

Thus, there is proposed a projection lens in which an intermediate image is formed by a first optical system constituted by a plurality of lenses and is re-imaged by a second optical system also constituted by a plurality of lenses (refer to JP2006-330410A and JP2019-2969A). A projection lens of a system that forms an intermediate image can shorten the back focus of the second optical system, can reduce the lens diameter on the magnification side of the second optical system, and is suitable for widening an angle by reducing a focus distance.

As such a projection lens of a projector that uses a plurality of optical systems, there is a projection lens having a configuration in which an optical axis is bent by a mirror (reflection portion) (refer to JP6378448B). The projection lens described in JP63078448B has three optical systems, which include a first optical system that functions as an incident optical system on which light is incident from a projector, a second optical system that functions as an intermediate optical system located in the middle, and a third optical system that functions as an output optical system. The second optical system has an intermediate-image formation lens, and a first reflection portion is provided between the first optical system and the second optical system. A second reflection portion is provided between the second optical system and the third optical system. The projection lens described in JP6378448B is capable of adjusting the relative position between the optical axis of the second optical system and the first reflection portion. Therefore, it is necessary to adjust or fix the position while pressing in a direction intersecting the first optical axis.

However, in order to adjusts the relative position between the optical axis of the second optical system and the first reflection portion, the projection lens described in JP6378448B is positioned and fixed while pressing a holding portion having the second optical system in the direction along the second optical axis, i.e., the direction intersecting the first optical axis. Therefore, stress that bends or damages a lens barrel that holds the first optical system may be applied to the lens barrel. In view of these circumstances, there has been a demand for a new projection lens that adjusts the relative positional relationship between the optical axis of the first optical system and the first reflecting portion that bends the optical axis of the first optical system.

SUMMARY

An object of a technology according to the present disclosure is to provide a projection lens capable of adjusting the relative positional relationship between the optical axis of the first optical system and the first reflection portion that bends the optical axis of the first optical system.

To achieve the aforementioned object, a projection lens according to the present disclosure is a projection lens configured to be attached to a housing of a projection apparatus having an electro-optical element. The projection lens includes a first holding portion that holds a first optical system disposed along a first optical axis through which light from the housing passes, a first reflection portion that bends light having the first optical axis into light having a second optical axis, a second holding portion that holds the first reflection portion, and a second holding portion fixing mechanism that fixes the second holding portion to the first holding portion. By weakening a fixing force of the second holding portion fixing mechanism, the second holding portion can be shifted relative to the first holding portion.

It is preferable that the second holding portion is capable of being shifted with respect to the first holding portion in an extension direction of the second optical axis.

It is preferable that the second holding portion fixing mechanism comprises a male screw, a female screw that engages with the male screw, and an insertion hole through which the male screw is inserted, the male screw being formed in one of the first holding portion or the second holding portion, and the insertion hole being formed in another of the first holding portion or the second holding portion.

It is preferable that the second holding portion includes a second reflection portion that bends light having the second optical axis into light having a third optical axis, a distance of the first optical axis between a most upstream lens of the first optical system and the first reflection portion being longer than a distance of the second optical axis between the first reflection portion and the second reflection portion.

It is preferable that the second holding portion fixing mechanism fixes the second holding portion to a surface among outer peripheral surfaces of the first holding portion, the surface being parallel to a surface intersecting the first optical axis.

It is preferable that the first optical system comprises an intermediate-image formation lens that is on an upstream side of the first reflection portion and that forms an intermediate image.

It is preferable that the intermediate image is formed at the second holding portion.

It is preferable that the second holding portion fixing mechanism includes an adhesive that adheres the second holding portion to the first holding portion.

It is preferable that the second holding portion has a holding frame that integrally holds the first reflection portion and the second reflection portion, the holding frame being a resin molded article.

It is preferable that an outer peripheral surface of the holding frame has an opening portion in an emission-side direction of light having the first optical axis.

It is preferable that the second holding portion comprises a lens frame fixing mechanism that fixes a lens frame that holds a second optical system disposed along the second optical axis in the second holding portion, the first optical axis extending in a first direction having a first A direction that is a light incident side and a first B direction that is a light emission side, the second holding portion being fixed by the second holding portion fixing mechanism to, of outer peripheral surfaces of the first holding portion, an end surface directed in the first B direction, and the lens frame being fixed by the lens frame fixing mechanism to, of inner surfaces of the second holding portion, a surface directed in the first B direction as with the end surface.

A projection apparatus according to the present disclosure includes any one of the aforementioned projection lenses, the electro-optical element, and the housing.

DETAILED DESCRIPTION

Figure 1:
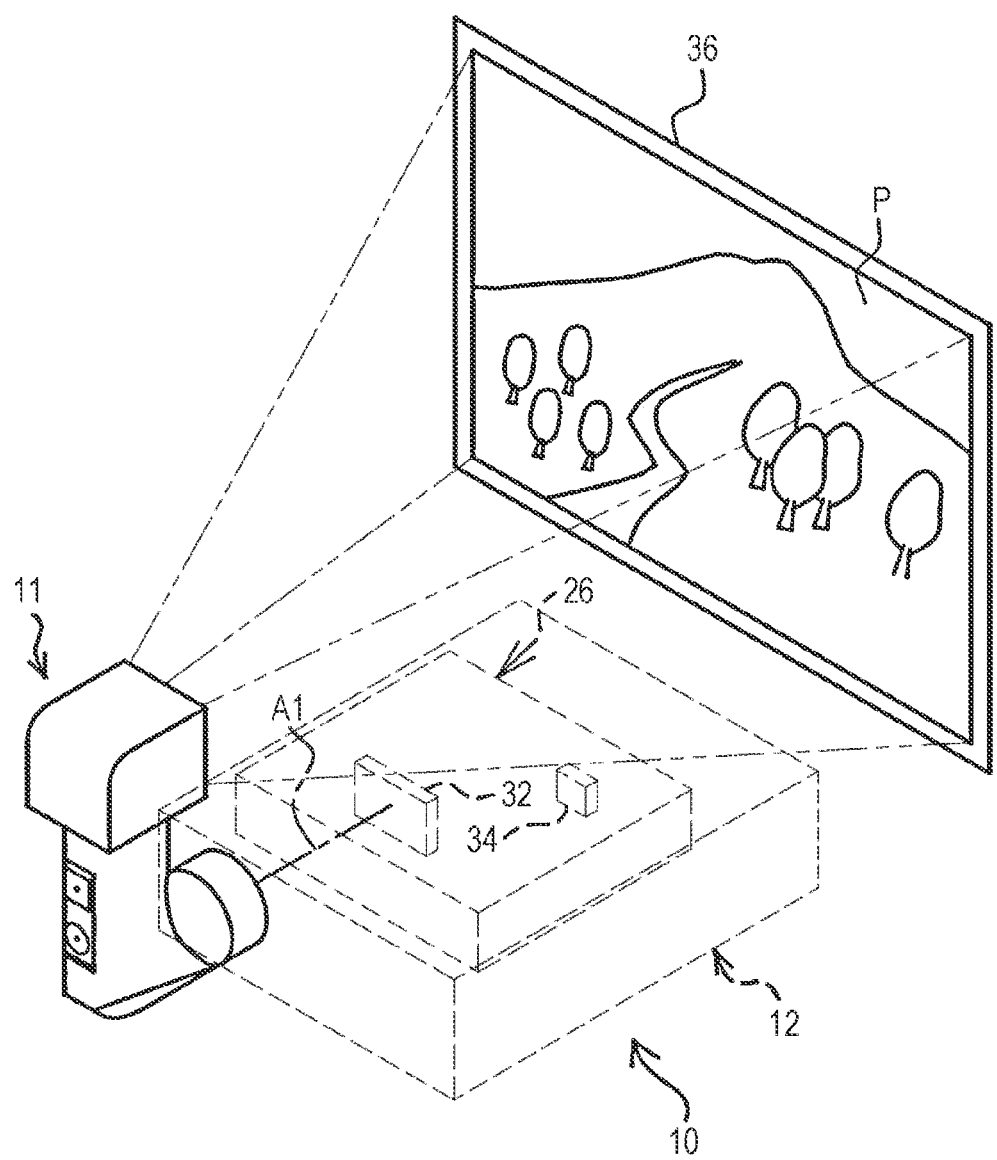
FIG. 1 is a usage example of a projector having a projection lens according to an embodiment.

Hereinafter, an example of an embodiment of the technology according to the present disclosure will be described with reference to the drawings.

The terms such as "first", "second", "third", and the like used in the present specification are given to avoid confusion among components and do not limit the number of components present in a projection lens. In addition, "up", "down", "right", and "left" used in the present specification denote directions in the drawings unless otherwise specified and are not absolute directions.

As illustrated in FIG. 1, a projector 10 is an example of a projection apparatus that projects an image P onto a screen 36. A projection lens 11 according to the present embodiment is used by being attached to a main body portion 12 of the projector 10. The main body portion 12 corresponds to a housing of the projector 10. The main body portion 12 houses main components, such as an image formation unit 26 and a control substrate (not illustrated). The projection lens 11 may be of a type incorporated in the projector 10 or may be attached to the projector 10 to be replaceable with another replacement lens.

A light flux indicating an image formed by the image formation unit 26 is incident on the projection lens 11 along an optical axis A1 from the main body portion 12. The projection lens 11 expands image light based on the incident light flux by an optical system to form an image. Consequently, the projection lens 11 projects an expanded image of the image P formed by the image formation unit 26 onto the screen 36 set at the outside of the projector 10.

The image formation unit 26 forms an image to be projected. The image formation unit 26 includes an image formation panel 32, which is an electro-optical element, a light source 34, a light guide member (not illustrated), and the like. The light source 34 irradiates the image formation panel 32 with light. The light guide member guides the light from the light source 34 to the image formation panel 32. The image formation unit 26 is, for example, a reflective type image formation unit that uses a DMD (Digital Mirror Device) as the image formation panel 32. As well known, the DMD is an image display element having a plurality of micromirrors capable of changing a reflection direction of light emitted from the light source 34 and in which the micromirrors are two-dimensionally arranged for each pixel. The DMD performs optical modulation in accordance with an image by changing the direction of each micromirror in accordance with the image to thereby switch the ON state and the OFF state of the reflection light of the light from the light source 34.

A white light source is an example of the light source 34. The white light source emits white light. The white light source is, for example, a light source that is realized by a combination of a laser light source and a fluorescent body. The laser light source emits blue light as excitation light with respect to the fluorescent body. The fluorescent body emits yellow light by being excited by the blue light emitted from the laser light source. The white light source emits white light by combining the blue light emitted from the laser light source and yellow light emitted from the fluorescent body.

The image formation unit 26 is further provided with a rotary color filter that converts the white light emitted by the light source 34 into color light such as blue light B (Blue), green light G (Green), and red light R (Red) selectively in a time division manner. As a result of the image formation panel 32 being irradiated with color light B, G, and R selectively, image light carrying image information of the color light B, G, and R is obtained. Thus obtained image light of each color is selectively incident on the projection lens 11 and is thereby projected toward the screen 36. The image light of each color is integrated on the screen 36, and the image P of full colors is displayed on the screen 36.

Figure 2:
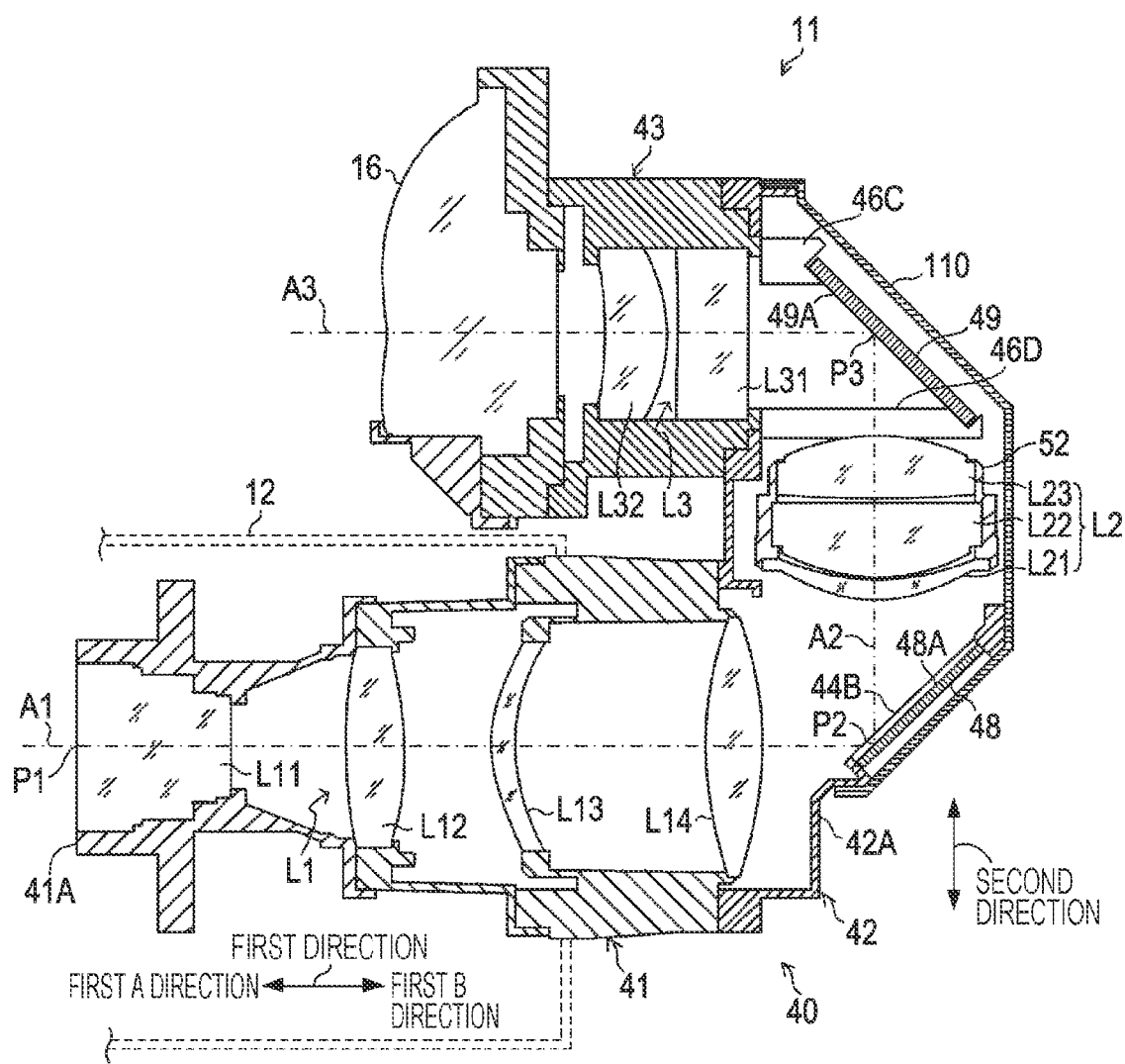
FIG. 2 is a longitudinal sectional view passing through an optical axis of a projection lens according to an embodiment.

The projection lens 11 includes a lens barrel 40 illustrated in FIG. 2. The projection lens 11 is illustrated in FIG. 1 in a form in which an exterior cover is provided at the outer side of the lens barrel 40 but is illustrated in FIG. 2 and the subsequent drawings in a form in which the exterior cover is detached from the projection lens 11.

Figure 3:
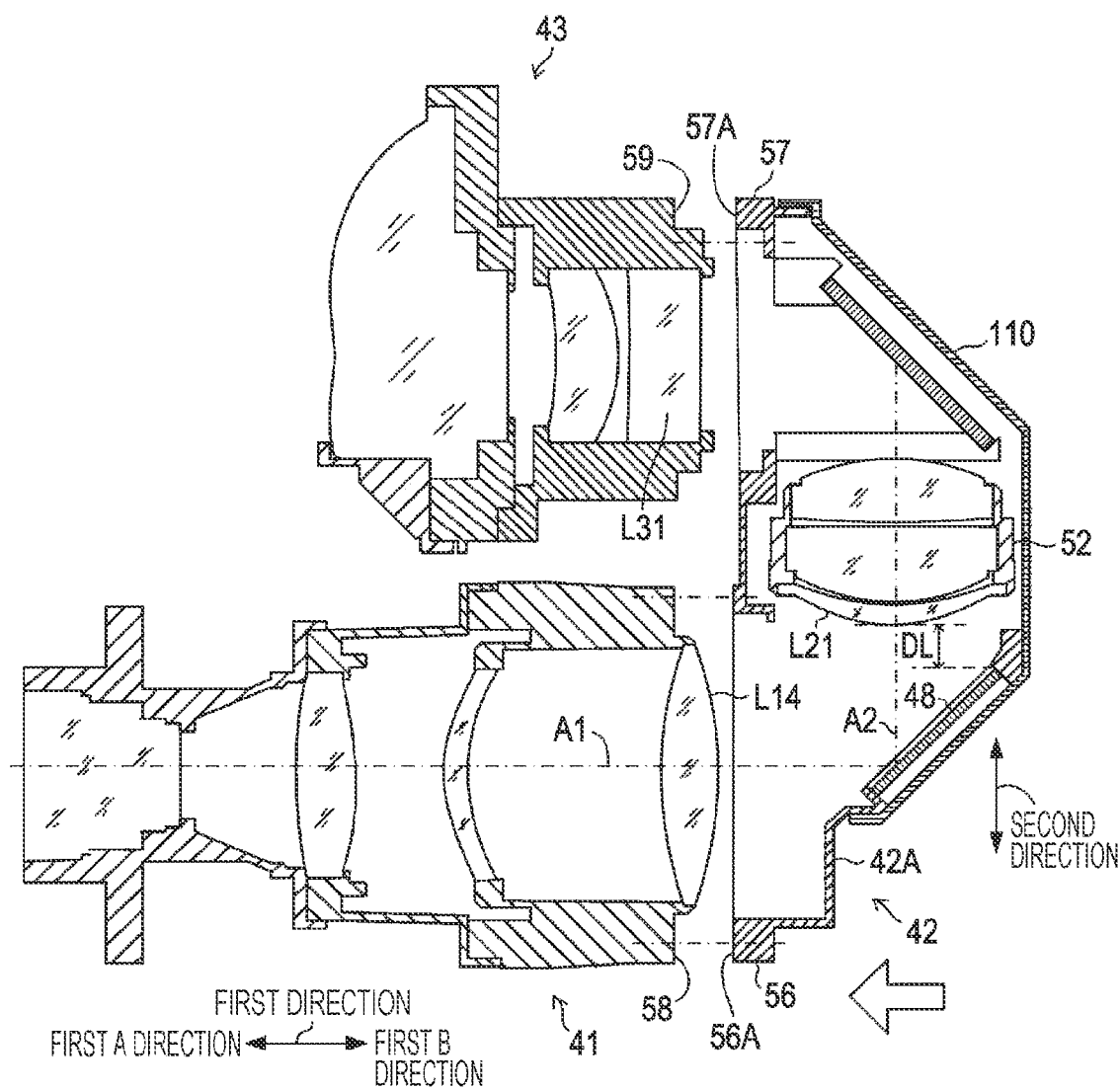
FIG. 3 is a longitudinal sectional view illustrating joint parts between a first barrel portion and a second barrel portion and between the second barrel portion and a third barrel portion of a projection lens according to an embodiment.

As illustrated in FIG. 2 and FIG. 3, the projection lens 11 has, as an example, a bending optical system that bends an optical axis twice. The bending optical system has a first optical axis A1, a second optical axis A2, and a third optical axis A3. The second optical axis A2 is an optical axis that is bent by 90° with respect to the first optical axis A1. The third optical axis A3 is an optical axis that is bent by 90° with respect to the second optical axis A2. Here, 90° is a value that includes an error allowable in design. As illustrated in FIG. 2, a direction in which the first optical axis A1 extends is referred to as a first direction. In the first direction, a light-incident-side direction and a light-emission-side direction in the first optical axis A1 are also referred to as a first A direction and a first B direction, respectively. A direction in which the second optical axis A2 extends is also referred to as a second direction. In the present example, the first optical axis A1 and the third optical axis A3 are parallel to each other. The first direction thus coincides with a direction in which the third optical axis A3 extends.

The lens barrel 40 houses the bending optical system. The lens barrel 40 includes a first barrel portion 41, a second barrel portion 42, and a third barrel portion 43. The first barrel portion 41 corresponds to a first holding portion. The second barrel portion 42 corresponds to a second holding portion. The third barrel portion 43 corresponds to a third holding portion. The incident side of the first barrel portion 41 is attached to the main body portion 12 of the projector 10. The incident side of the second barrel portion 42 is connected to the emission side of the first barrel portion 41. The incident side of the third barrel portion 43 is connected to the emission side of the second barrel portion 42.

The first barrel portion 41 houses and holds, in the inner portion thereof, a first optical system L1 disposed along the first optical axis A1. The second barrel portion 42 houses and holds, in the inner portion thereof, a second optical system L2 disposed along the second optical axis A2. The third barrel portion 43 houses and holds, in the inner portion thereof, a third optical system L3 disposed along the third optical axis A3. The center axis of the first barrel portion 41 substantially coincides with the first optical axis A1. The center axis of the second barrel portion 42 substantially coincides with the second optical axis A2. The center axis of the third barrel portion 43 substantially coincides with the third optical axis A3.

In the lens barrel 40, the first barrel portion 41 is a barrel portion positioned on the most incident side, the third barrel portion 43 is a barrel portion positioned on the most emission side, and the second barrel portion 42 is a barrel portion positioned between the first barrel portion 41 and the third barrel portion 43. The second barrel portion 42 houses and holds a first mirror 48 and a second mirror 49, in addition to the second optical system L2.

The first optical system L1 is constituted by, for example, a lens L11, a lens L12, a lens L13, and a lens L14. The lenses L11 to L14 are disposed in this order from the upstream side, that is, the light incident side. The lens L11 is, for example, a zoom lens group. In the drawings, to simplify the description, the detailed configuration of each of the lenses L11 to L14 is omitted, and each lens is illustrated as one lens. The each lens, however, may be one lens or may be constituted by a plurality of lenses.

In the second barrel portion 42, the first mirror 48, the second optical system L2, and the second mirror 49 are disposed in this order from the incident side. The first mirror 48 is positioned on the most incident side in the second barrel portion 42 and is disposed near the emission end of the first barrel portion 41. The second mirror 49 is positioned on the most emission side in the second barrel portion 42 and is disposed near the incident end of the third barrel portion 43.

In the second direction in which the second optical axis A2 extends, the first mirror 48 and the second optical system L2 do not overlap each other. Specifically, as illustrated in FIG. 3, the upper end of the first mirror 48 in the second direction and the lower end of the second optical system L2 in the second direction are separated from each other by a distance DL. That is, the first mirror 48 and the second optical system L2 do not overlap each other in the second direction and are spaced apart from each other.

The first mirror 48 is one of optical elements constituting the bending optical system and forms the second optical axis A2 by bending the first optical axis A1. The first mirror 48 is a first reflection portion that bends light having the first optical axis A1 into light having the second optical axis A2. The first mirror 48 is disposed in an orientation in which a reflection surface 48A of the first mirror 48 forms an angle of 45° with respect to each of the first optical axis A1 and the second optical axis A2. The first mirror 48 is, for example, a specular reflection-type mirror in which a transparent member, such as glass, is coated with a reflection film.

As with the first mirror 48, the second mirror 49 is also one of the optical elements constituting the bending optical system and is a reflection portion that bends an optical axis. The second mirror 49 forms the third optical axis A3 by bending the second optical axis A2. The second mirror 49 is a second reflection portion that bends light having the second optical axis A2 into light having the third optical axis A3. The second mirror 49 is disposed in an orientation in which a reflection surface 49A of the second mirror 49 forms an angle of 45° with respect to each of the second optical axis A2 and the third optical axis A3. The second mirror 49 is also, for example, the same specular reflection-type mirror as the first mirror 48.

The second optical system L2 is constituted by, for example, a lens L21, a lens L22, and a lens L23. The lenses L21 to L23 are disposed in this order from the upstream side, that is, the light incident side. Each of the lenses L21, L22, and L23 may be one lens or may be a cemented lens.

A distance of the first optical axis A1 between the most upstream lens L11 of the first optical system L1 and the first mirror 48 is longer than a distance of the second optical axis A2 between the first mirror 48 and the second mirror 49. Specifically, as illustrated in FIG. 2, a point at which the first optical axis A1 and the light incident surface of the lens L11 intersect each other is indicated by P1, a point at which the first optical axis A1 and the reflection surface 48A of the first mirror 48 intersect each other is indicated by P2, and a point at which the second optical axis A2 and the reflection surface 49A of the second mirror 49 intersect each other is indicated by P3. In this case, a distance between P1 and P2 is longer than a distance between P2 and P3. That is, in the lens barrel 40, the second barrel portion 42 that houses the second optical system L2 is compact with respect to the first barrel portion 41 that houses the first optical system L1.

The third optical system L3 is an emission optical system and is constituted by, for example, a lens L31, a lens L32, and an emission lens 16 that are disposed in this order from the upstream side, that is, the light incident side. The lens L31 and the lens L32 constitute, for example, a focus lens group. The emission lens 16 is disposed at the emission-side end portion on the most emission side in the third barrel portion 43.

As illustrated in FIG. 2, light from the image formation unit 26 of the main body portion 12 is incident on an incident-side end portion 41A of the first barrel portion 41. In the first optical system L1, the lens L14 functions as an intermediate-image formation lens. The lens L14 condenses an incident light flux and forms an intermediate image on the upstream side of the first mirror 48 in the vicinity of the first mirror 48 in the second barrel portion 42. The diameter of the light flux emitted by the lens L14 is reduced by an effect of image formation of the lens L14. The lens L14 is present on the upstream of the first mirror 48, and thus, the light flux whose diameter is reduced by the lens L14 is incident on the first mirror 48. It is thus possible to reduce the size of the first mirror 48. The intermediate image is formed in the inner portion of the second barrel portion 42. The intermediate image may be formed on the downstream side of the first mirror 48 in the vicinity of the first mirror 48.

The light flux reflected by the first mirror 48 is incident on the second optical system L2. The second optical system L2 functions as a relay lens that relays, with an intermediate image formed by the lens L14 being a photographic subject, a light flux representing the intermediate image to the third optical system L3. The second optical system L2 is constituted by, for example, three lenses, which are the lens L21, the lens L22, and the lens L23. The second optical system L2 causes the light flux reflected by the first mirror 48 to be incident on the second mirror 49. The second mirror 49 reflects the light flux incident from the second optical system L2 toward the third optical system L3.

The third optical system L3 emits the light flux incident from the second mirror 49 toward the screen 36 from the emission lens 16. Thus, the light incident on the incident-side end portion 41A from the main body portion 12 is emitted toward the screen 36 from the emission lens 16, and the image P is projected on the screen 36.

A portion of the first barrel portion 41, and the second barrel portion 42, and the third barrel portion 43 are each formed by a resin material. In contrast, the frame constituting the incident-side end portion 41A in FIG. 2 is formed by a metal material. Since the length of the first optical axis A1 passing through P1 and P2 is longer than the length of the second optical axis A2 passing through P2 and P3, there is a case in which the incident-side end portion 41A is positioned at a deep location in the projector 10 when the projection lens 11 is attached to the projector 10. When being present at such a location, the incident-side end portion 41A is strongly affected by heat generation of the light source 34 (refer to FIG. 1) in the projector 10. Therefore, the frame that constitutes the incident-side end portion 41A is preferably a metal material having high heat resistance.

The first barrel portion 41 and the third barrel portion 43 each have a frame member having a general cylindrical shape that is the same as that of a general lens barrel portion. Specifically, a general cylindrical shape is a shape in which only the incident side and the emission side, which are both ends of the cylindrical shape in the axial direction, are open and in which an internal cavity has a sectional shape orthogonal to the axial direction, the sectional shape being a circular shape corresponding to the outer shape of a circular lens. Each of the first optical system L1 and the third optical system L3 is held by such a frame member having a general cylindrical shape. In the assembly of the first barrel portion 41 and the first optical system L1, the first optical system L1 is inserted in the axial direction of the cylindrical shape through the incident-side opening or the emission-side opening of the first barrel portion 41. Similarly, in the assembly of the third barrel portion 43 and the third optical system L3, the third optical system L3 is inserted in the axial direction of the cylindrical shape through the incident-side opening or the emission-side opening of the third barrel portion 43.

Figure 4:
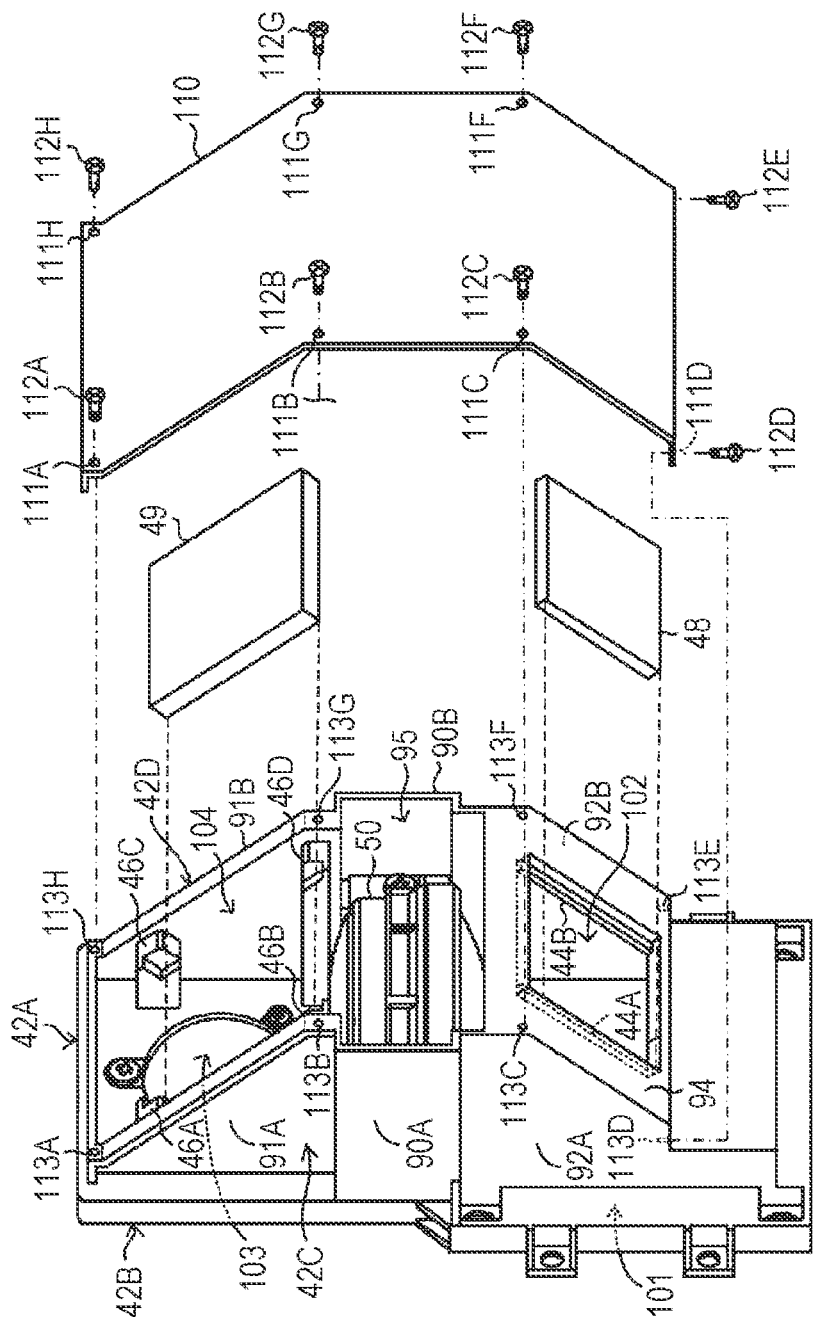
FIG. 4 is a back-surface-side perspective view illustrating assembly of a first mirror, a second mirror, and a cover portion to a holding frame according to an embodiment.
Figure 5A:
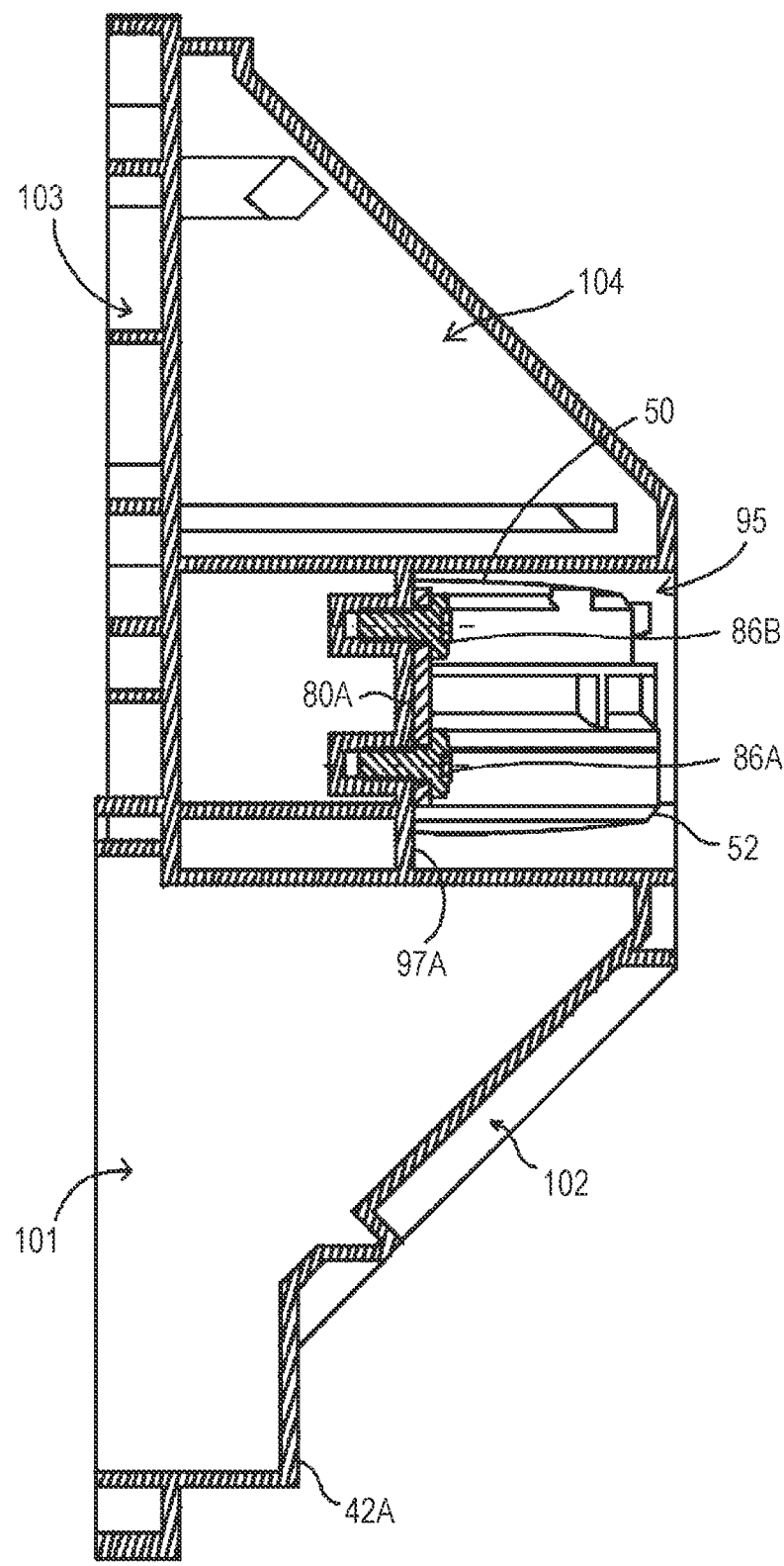
FIG. 5A is a sectional view taken along line A-A in the back view in FIG. 5B.
Figure 5B:
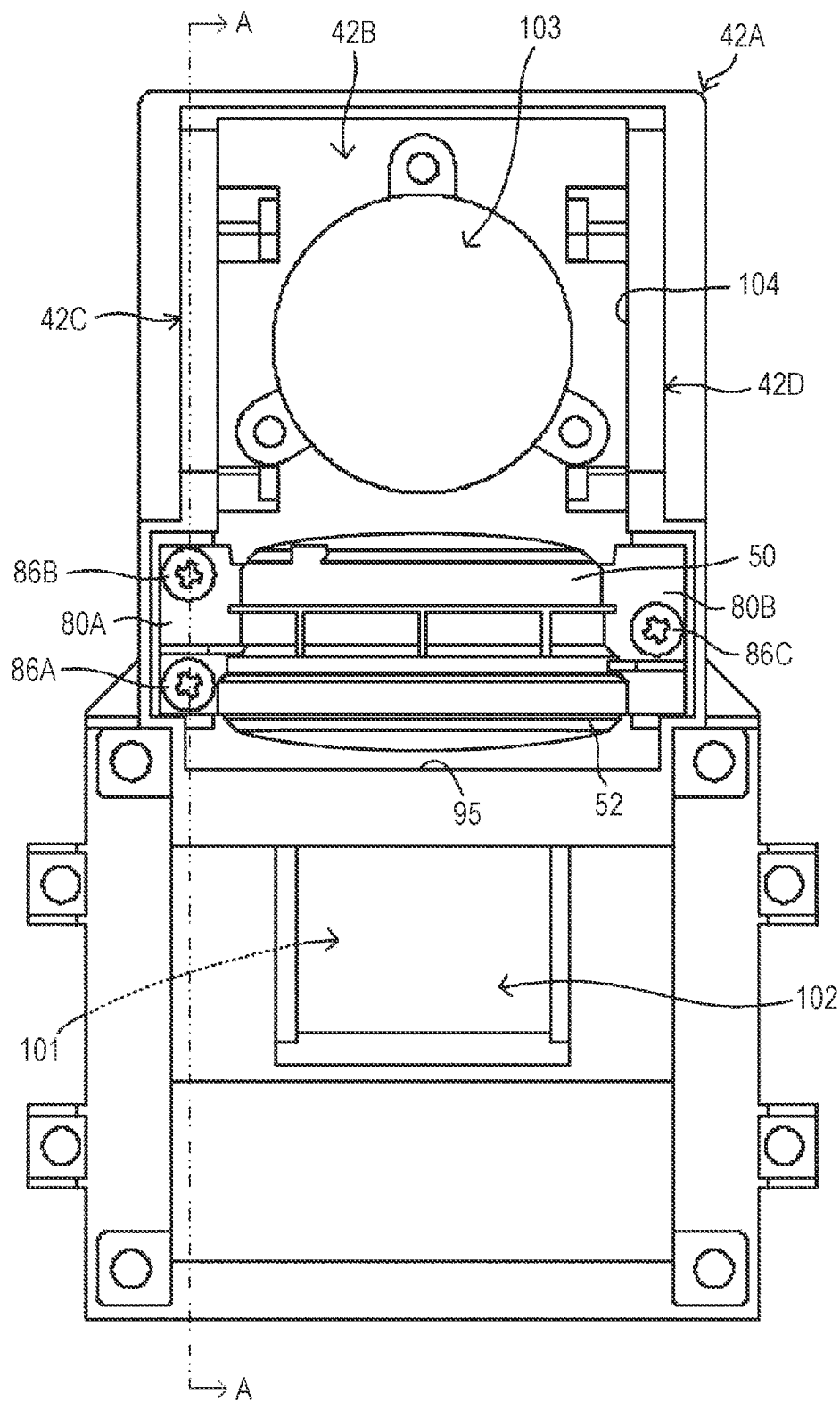
FIG. 5B is a back view in which a lens unit is assembled to a holding frame according to an embodiment.

In contrast, as illustrated in FIG. 4, FIG. 5A, and FIG. 5B, the second barrel portion 42 has, as frame members, a holding frame 42A having a shape that differs from a general cylindrical shape and a lens frame 52 including the second optical system L2.

Specifically, as illustrated in FIG. 5A, the holding frame 42A has a substantially trapezoidal shape as viewed from a side, and, as illustrated in FIG. 4 and FIG. 5B, parts other than the incident side and the emission side are open. Regarding a sectional shape of the internal cavity, a sectional shape orthogonal to the second optical axis A2 direction is rectangular. In the holding frame 42A, the lower side is the first optical axis A1 side and the upper side is the third optical axis A3 side in the second optical axis A2 direction. In the first optical axis A1 direction, the first barrel portion 41 side is the front surface, and the side opposite thereto is the back surface. That is, the back surface of the holding frame 42A is, of the outer peripheral surface of the holding frame 42A, a surface in the emission-side direction of light having the first optical axis A1.

In FIG. 4, the holding frame 42A is a resin product that is manufactured by injecting a resin into a mold and is integrally molded. The holding frame 42A integrally holds the first mirror 48 and the second mirror 49. Here, integrally holding means holding the first mirror 48 and the second mirror 49 with the same one component.

The holding frame 42A has, on the front surface side, a rectangular base plate 42B elongated in the up-down direction. The base plate 42B (a first contact surface 56A in FIG. 3) is provided with a first opening 101 at a position facing the emission side of the first barrel portion 41. The first opening 101 is an opening through which a first light flux emitted from the first optical system L1 and having the first optical axis A1 passes. In addition, the base plate 42B (a second contact surface 57A in FIG. 3) is provided with a third opening 103 at a position facing the incident side of the third barrel portion 43. The third opening 103 is an opening through which a third light flux bent by the second mirror 49 and having the third optical axis A3 passes.

On the back surface side of the base plate 42B, two side walls 42C and 42D constituting side surfaces of the holding frame 42A are formed respectively at both ends in the left-right direction orthogonal to the up-down direction. The side wall 42C and the side wall 42D are formed on the base plate 42B to project toward the back surface side. In the holding frame 42A, a space formed between the side wall 42C and the side wall 42D is a space that houses the first mirror 48, the second optical system L2, and the second mirror 49.

The side wall 42C and the side wall 42D are each one plate-shaped part. In the present example, portions of each of the side walls 42C and 42D may be distinguished partially by positions in the up-down direction for convenience and may be referred to as follows. That is, regarding the side wall 42C on the left side in FIG. 3, a part positioned at the center in the up-down direction is referred to as a center side wall 90A, a part upper than the center side wall 90A is referred to as an upper side wall 91A, and a part lower than the center side wall 90A is referred to as a lower side wall 92A. Regarding the side wall 42D on the right side, a part positioned at the center in the up-down direction is referred to as a center side wall 90B, a part upper than the center side wall 90B is referred to as an upper side wall 91B, and a part lower than the center side wall 90B is referred to as a lower side wall 92B.

In FIG. 4, in the up-down direction of the holding frame 42A, the positions of the lower side walls 92A and 92B correspond to the position at which the first mirror 48 is disposed, the positions of the center side walls 90A and 90B correspond to the position at which the second optical system L2 is disposed, and the positions of the upper side walls 91A and 91B correspond to the position at which the second mirror 49 is disposed.

In the outer peripheral surface of the holding frame 42A, an opening extending upward from the center is formed between the side wall 42C and the side wall 42D in the emission-side direction of light having the first optical axis A1, that is, on the back surface side. That is, on the back surface side, the upper side wall 91A and the upper side wall 91B are not connected to each other with an opening therebetween, and the center side wall 90A and the center side wall 90B are not connected to each other with the opening therebetween. The opening is one opening in the present example. However, hereinafter, a part between the upper side wall 91A and the upper side wall 91B is referred to as a fourth opening 104, and a part between the center side wall 90A and the center side wall 90B is referred to as an opening portion 95.

The fourth opening 104 functions as an opening through which the second mirror 49 is attached. The fourth opening 104 faces a surface of the second mirror 49 opposite to the reflection surface 49A. The opening portion 95 functions as an opening through which a lens unit 50 is attached. The opening portion 95 thus has a size that enables insertion of the lens unit 50.

On the back surface side of the holding frame 42A, the side wall 42C and the side wall 42D are connected to each other by a lower inclined surface 94. A second opening 102 is formed in the lower inclined surface 94. The second opening 102 is an opening through which the first mirror 48 is attached. The second opening 102 faces a surface of the first mirror 48 opposite to the reflection surface 48A.

As described above, the holding frame 42A is provided with the first opening 101 and the second opening 102 at positions facing each other in the first direction. In addition, the third opening 103 and the fourth opening 104 are provided at positions facing each other in the first direction.

Figure 6:
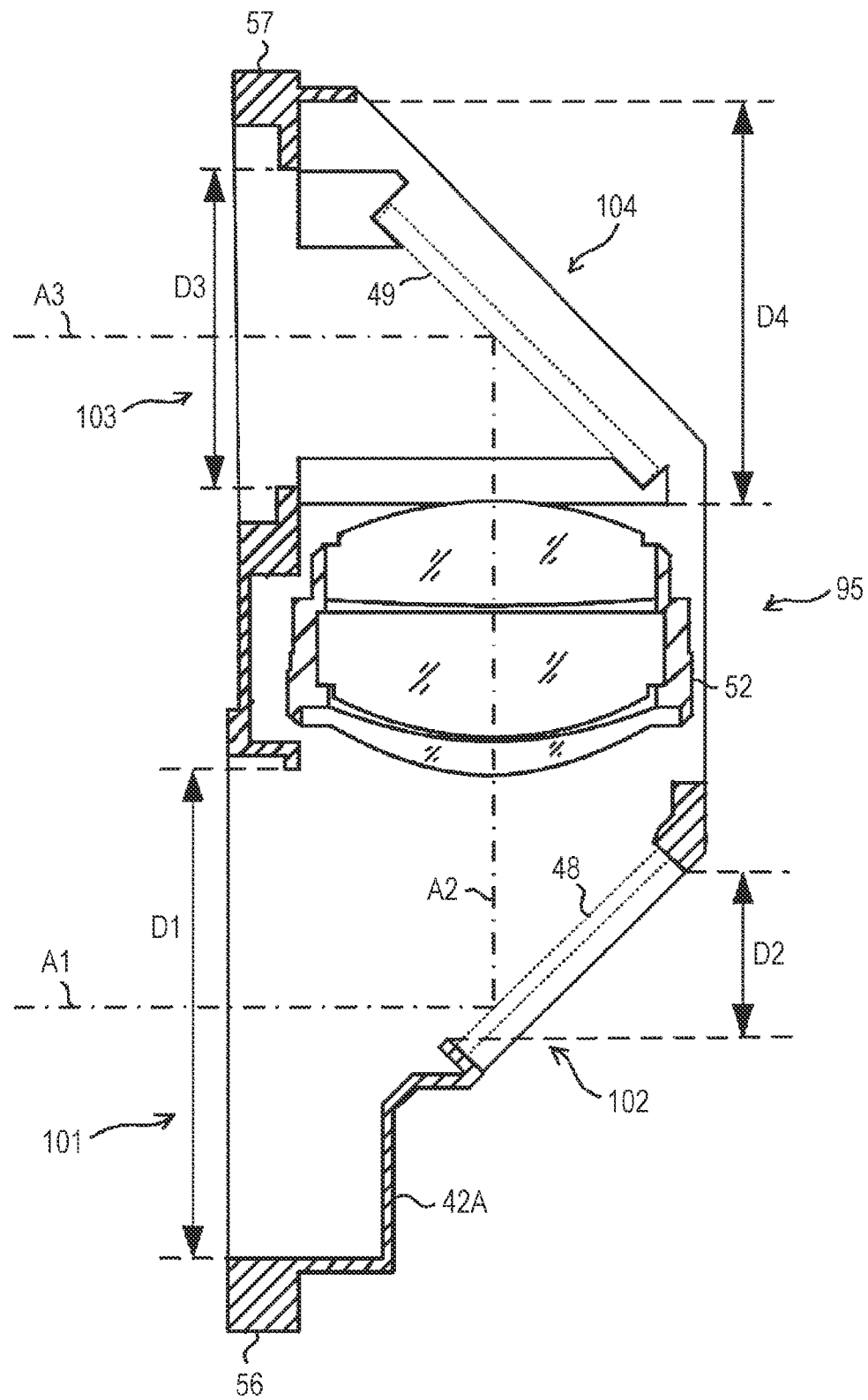
FIG. 6 is a longitudinal sectional view illustrating a first opening, a second opening, a third opening, and a fourth opening of a holding frame according to an embodiment.

As illustrated in FIG. 6, in the holding frame 42A, a length D1 of the first opening 101 on the front surface side in the up-down direction is larger than length D2 of the second opening 102 on the back surface side. That is, the opening area of the first opening 101 is larger than the opening area of the second opening 102. A length D3 of the third opening 103 on the front surface side in the up-down direction is smaller than length D4 of the fourth opening 104 on the back surface side. That is, the opening area of the third opening 103 is smaller than the opening area of the fourth opening 104.

As described above, in the openings that are disposed on the front surface side and the back surface side, respectively, in the holding frame 42A and that are disposed at the positions facing each other, specifically, in each of a pair of the first opening 101 and the second opening 102 and a pair of the third opening 103 and the fourth opening 104, the opening area of one of the openings is large, and the opening area of the other of the openings is small. This is in consideration of ease of mold removal in molding of the holding frame 42A with the use of two molds.

One of mutually facing openings is determined to be smaller for the following reasons.

The second opening 102 is smaller than the first opening 101 for the following reason. The first opening 101 is an opening through which the first light flux having the first optical axis A1 passes. The first opening 101 thus requires a size corresponding to the lens L14 (refer to FIG. 3). The second opening 102 is an opening through which the small first mirror 48 that reflects a light flux having a diameter reduced by the lens L14 is attached. Therefore, the opening area of the first opening 101 can be smaller than the opening area of the second opening 102.

The third opening 103 is smaller than the fourth opening 104 for the following reason. The third opening 103 simply allows the third light flux having a diameter reduced by the first optical system L1 and the second optical system L2. The third opening 103 is thus optically an opening having a diameter smaller than the first opening 101. The third opening 103 is small for a structural reason that, as described later, a joint portion for joining the third barrel portion 43 is to be provided around the third opening 103.

The fourth opening 104 is an opening through which the second mirror 49 is attached. The position and the orientation of the second mirror 49 are adjusted to attach the second mirror 49 to the holding frame 42A. More specifically, the position and the orientation of the second mirror 49 are adjusted to adjust a tangential surface and a sagittal surface that affect the astigmatism of the third optical system L3. To perform such adjustment, the second mirror 49 is, for example, sandwiched and held in the up-down direction by an adjusting-holding device. In this state, the second mirror 49 is moved two-dimensionally or three-dimensionally, and the orientation thereof is adjusted. To perform such adjustment, a space in which the adjustment holding device is inserted around the second mirror 49 and a gap for adjustment of the second mirror 49 in a state in which the adjustment holding device is inserted are to be ensured. In consideration of this, the fourth opening 104 is preferably comparatively large and is formed to be larger than the third opening 103.

Back to FIG. 4, in the holding frame 42A, first mirror holding portions 44A and 44B that hold the first mirror 48 are provided at the inner edge of the second opening 102. The first mirror holding portions 44A and 44B are in contact with the outer edge of the reflection surface 48A of the first mirror 48 and hold the first mirror 48. The first mirror holding portions 44 hold the first mirror 48 in an orientation in which the reflection surface 48A of the first mirror 48 forms an angle of 45° with respect to each of the first optical axis A1 and the second optical axis A2.

In the inner portion of the fourth opening 104 of the holding frame 42A, second mirror holding portions 46A, 46B, 46C, and 46D that hold the second mirror 49 are provided at the inner surfaces of the upper side walls 91A and 91B. The second mirror holding portions 46 hold the second mirror 49 in an orientation in which the reflection surface of the second mirror 49 forms an angle of 45° with respect to each of the second optical axis A2 and the third optical axis A3.

In FIG. 4, the holding frame 42A is provided with a cover portion 110 that covers the back surface side. The cover portion 110 has a size with which the second opening 102, the fourth opening 104, and the opening portion 95 are covered. The cover portion 110 has a light shielding property. As a result of the cover portion 110 being attached to the holding frame 42A, the internal space, in which the first mirror 48, the second optical system L2, and the second mirror 49 are housed, of the holding frame 42A is shielded from light.

The cover portion 110 is fixed to the holding frame 42A with male screws 112A to H being engaged with female screws 113A to H provided at the holding frame 42A through insertion holes 111A to H that are provided at positions corresponding to the female screws 113A to H.

The material of the cover portion 110 is, for example, a soft resin. The material of the holding frame 42A is, for example, a hard resin. Therefore, the bending rigidity of the cover portion 110 is lower than the bending rigidity of the holding frame 42A. The cover portion 110 is thus able to follow a bent portion between an end of the upper side wall 91A and an end of the center side wall 90A and a bent portion between an end of the center side wall 90A and an end of the lower side wall 92A.

Figure 7:
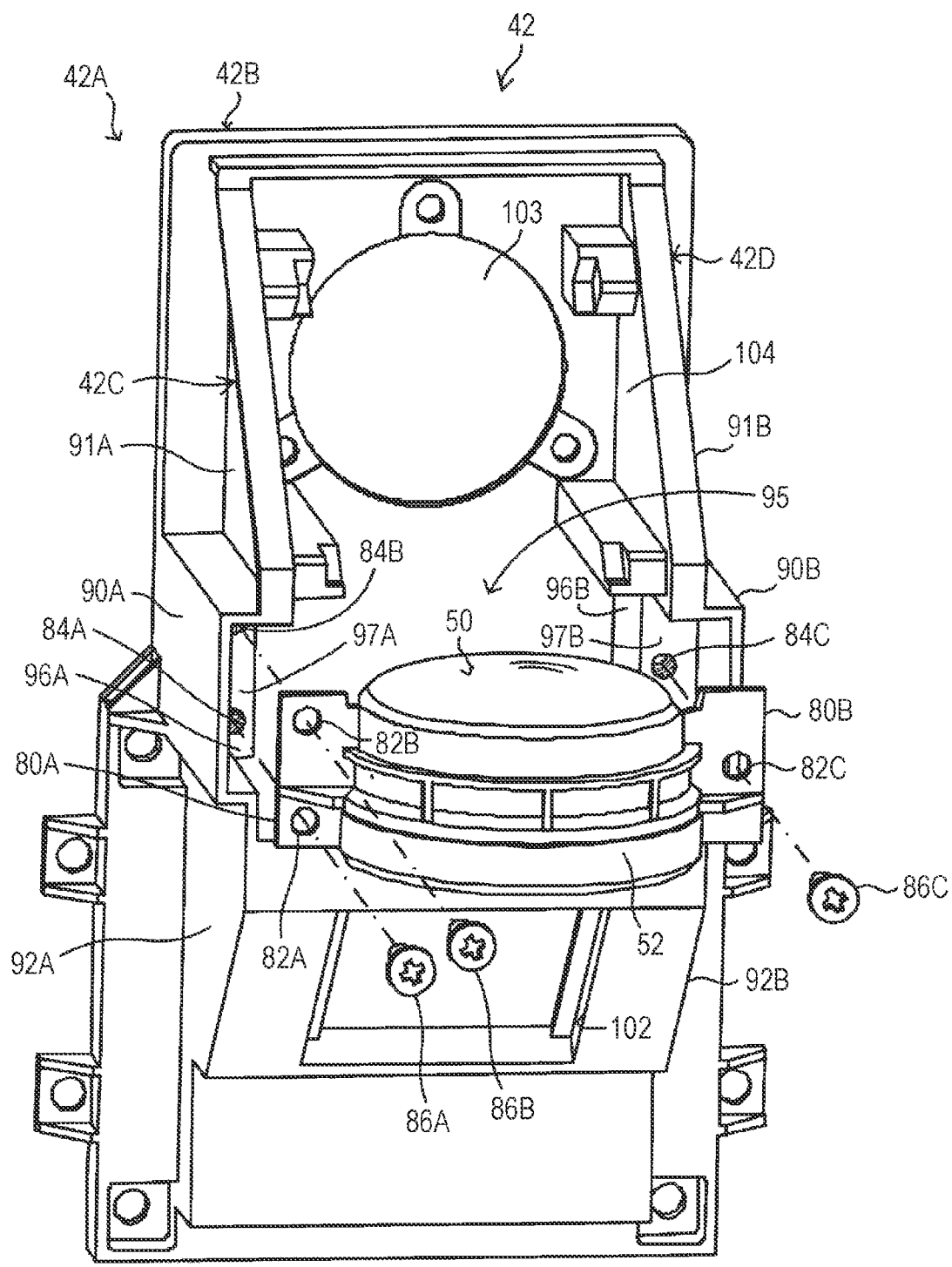
FIG. 7 is a perspective view of assembly of a lens unit as viewed from the back surface side of a holding frame according to an embodiment.

As illustrated in FIG. 7, the second optical system L2 is housed between the center side walls 90A and 90B of the holding frame 42A. The second optical system L2 is attached to the lens frame 52 and, in this state, is attached to the holding frame 42A. Hereinafter, the second optical system L2 in a state of being attached to the lens frame 52 is referred to as the lens unit 50.

Figure 8:
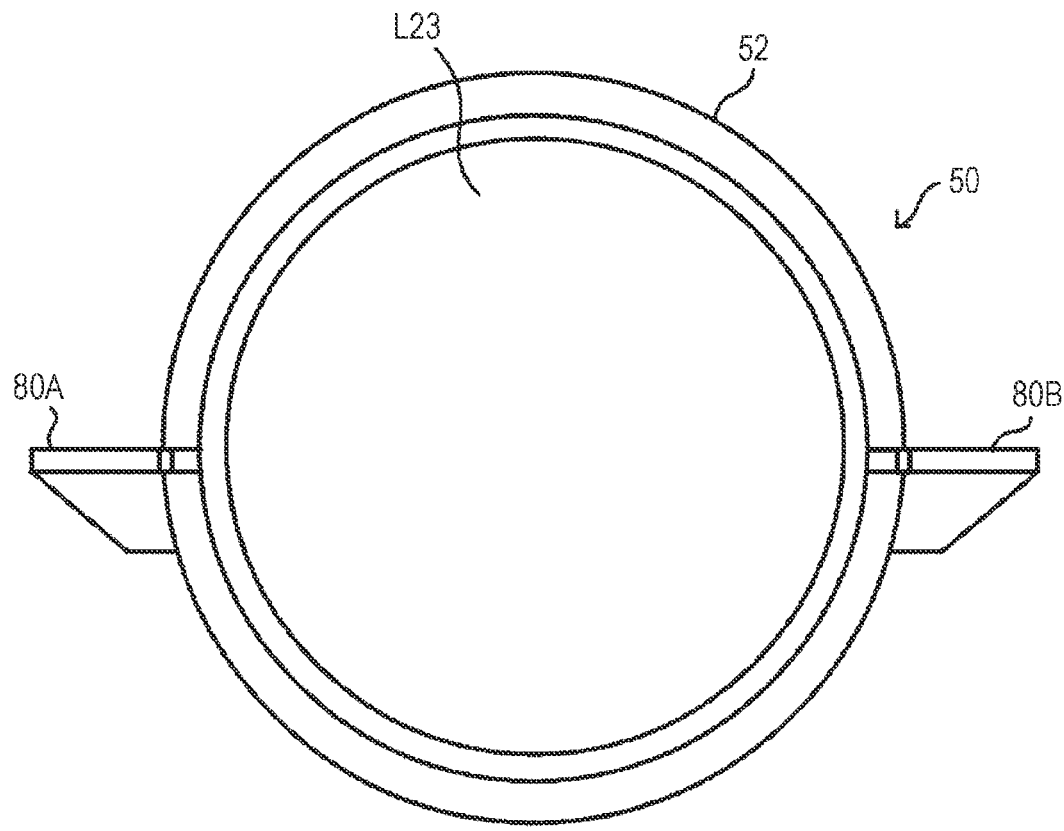
FIG. 8 is a top view (plan view) of a lens unit according to an embodiment.
Figure 9:
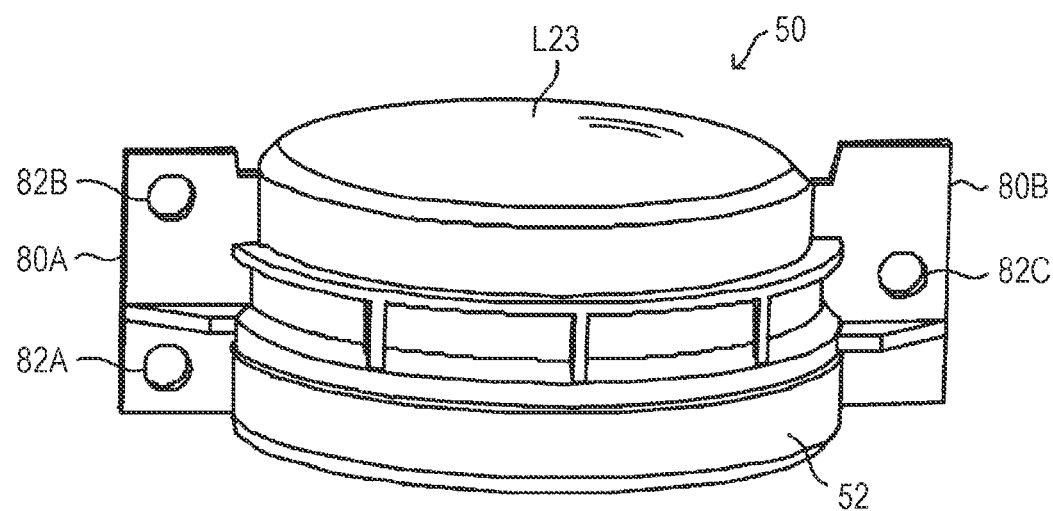
FIG. 9 is a perspective view of a lens unit according to an embodiment.

As illustrated in FIG. 8 and FIG. 9, the lens frame 52 is a resin frame that houses the lens L21, the lens L22, and the lens L23. The lens frame 52 has a circular shape, as with the outer shape of the lens L21 or the like. The lens frame 52 is provided with attachment plates 80A and 80B for attachment to the holding frame 42A. Each of the attachment plates 80A and 80B projects on the outer side in the radial direction of the lens frame 52. Each of the attachment plates 80A and 80B is disposed at a position inversed by 180° with respect to the center of the lens frame 52. The attachment plate 80A is provided with two holes, which are insertion holes 82A and 82B. The attachment plate 80B is provided with an insertion hole 82C.

A lens-frame attachment portion 96A is formed at the inner side of the center side wall 90A of the holding frame 42A. Female screws 84A and 84B are formed at an attachment surface 97A of the lens-frame attachment portion 96A. The attachment surface 97A is, of the inner surface of the holding frame 42A, a surface directed in a direction intersecting the second optical axis A2. The direction intersecting the second optical axis A2 means a direction that is not parallel to the second optical axis A2. In the present embodiment, the attachment surface 97A is, of the inner surface of the second barrel portion 42 (the holding frame 42A), a surface directed in the first B direction, that is, a surface orthogonal to the first direction. Here, orthogonal may include not only perfect orthogonal but also an angle error allowable in the manufacture of the holding frame 42A and/or an angle error allowable in optical design.

A lens-frame attachment portion 96B is formed at the inner side of the center side wall 90B. A female screw 84C is formed at an attachment surface 97B of the lens-frame attachment portion 96B. The attachment surface 97B is, of the inner surface of the holding frame 42A, a surface directed in a direction intersecting the second optical axis A2. The attachment surface 97B is a surface orthogonal to the first direction, as with the attachment surface 97A. The meaning of orthogonal is as described above.

The lens unit 50 is attached in a state in which the attachment plate 80A is in contact with the attachment surface 97A and in which the attachment plate 80B is in contact with the attachment surface 97B. The female screws 84A and 84B formed at the attachment surface 97A respectively correspond to the insertion holes 82A and 82B formed at the attachment plate 80A. The female screw 84C formed at the attachment surface 97B corresponds to the insertion hole 82C formed at the attachment plate 80B. The lens unit 50 is fixed to the holding frame 42A with male screws 86A, 86B, and 86C and the female screws 84A, 84B, and 84C being engaged with each other in a state in which the attachment plates 80A and 80B are in contact with the attachment surfaces 97A and 97B, respectively. The male screws 86, the female screws 84, and the insertion holes 82 correspond to a lens frame fixing mechanism.

As illustrated in FIG. 6, the holding frame 42A through which the second optical axis A2 passes has, in the inner portion thereof, the first mirror 48 and the second mirror 49 and is an integrated frame without a division portion such as that in the related art. It is difficult in such an integrated frame to insert male screws in the direction (the second direction) of the second optical axis A2 and fix the frame. However, in the embodiment illustrated in FIG. 7, it is possible to easily fix the lens frame 52 by inserting the male screws in the direction (the first direction) of the first optical axis A1.

Figure 10:
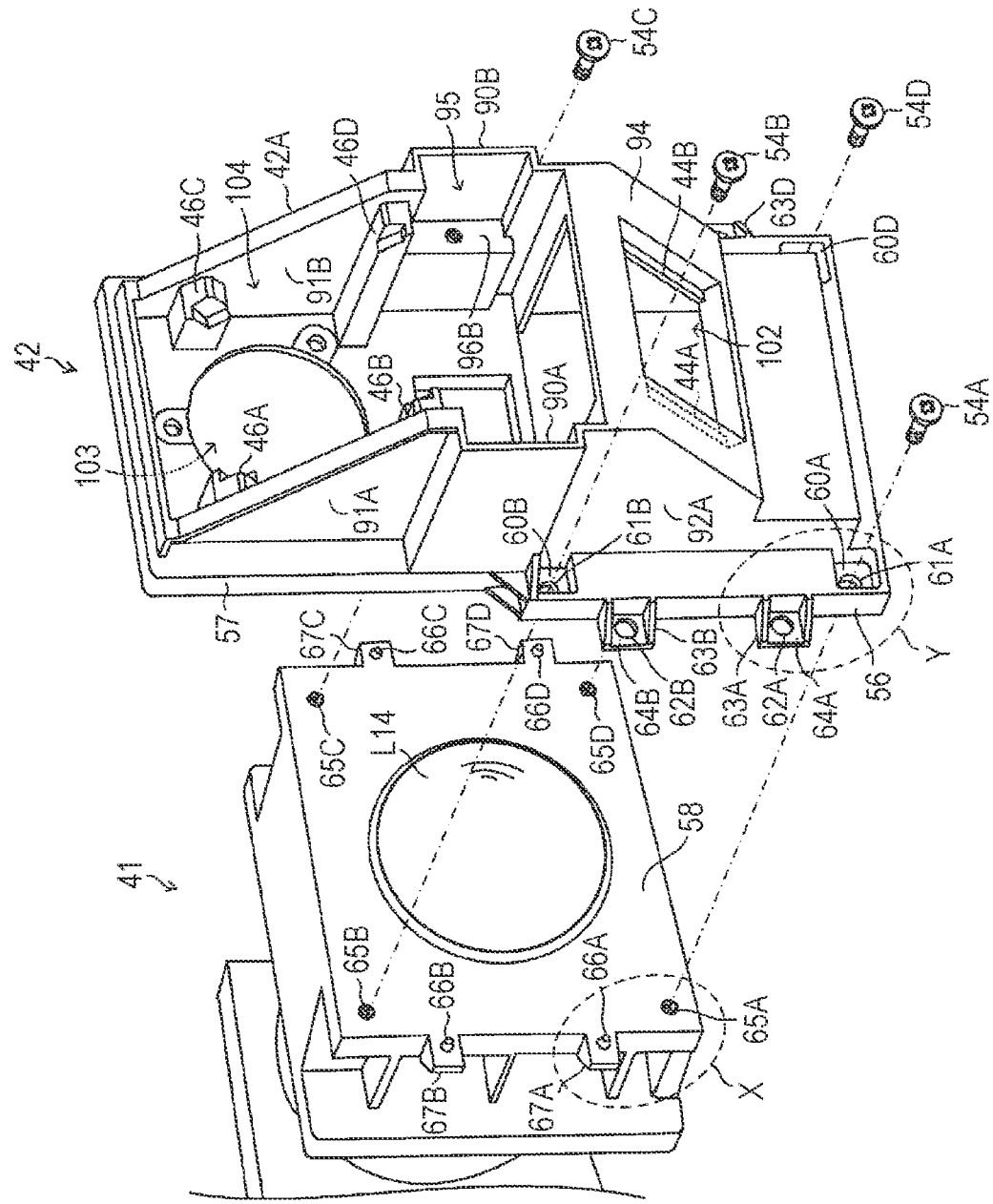
FIG. 10 is a perspective view illustrating a joint structure in which alignment of a first barrel portion and a second barrel portion of a projection lens according to an embodiment with respect to a first mirror is possible.

As illustrated in FIG. 10, the first barrel portion 41 and the second barrel portion 42 are fixed to each other by screws, and the third barrel portion 43 and the second barrel portion 42 are fixed to each other by screws. In FIG. 10, only the first barrel portion 41 and the second barrel portion 42 are illustrated. The relationship between the third barrel portion 43 and the second barrel portion 42 is the same.

Specifically, the first barrel portion 41 and the second barrel portion 42 are fixed by screws in a state in which a first joint portion 56 of a lower portion of the second barrel portion 42 is in contact with a joint surface 58 of the first barrel portion 41. As illustrated in FIG. 3, the third barrel portion 43 and the second barrel portion 42 are fixed by screws in a state in which a second joint portion 57 of an upper portion of the second barrel portion 42 is in contact with a joint surface 59 of the third barrel portion 43. The first joint portion 56 has, on the side facing the joint surface 58, the first contact surface 56A in contact with the joint surface 58. The second joint portion 57 has, on the side facing the joint surface 59, the second contact surface 57A in contact with the joint surface 59.

As illustrated in FIG. 3, the joint surface 58 is, of the outer peripheral surface of the first barrel portion 41, a surface that is parallel to a surface intersecting the first optical axis A1. The surface intersecting the first optical axis A1 means a surface that is not parallel to the first optical axis A1. In the present embodiment, the joint surface 58 is, of the outer peripheral surface of the first barrel portion 41, an end surface directed in the first B direction. That is, the joint surface 58 is a surface orthogonal to the first optical axis A1. Here, orthogonal may include not only perfect orthogonal but also an angle error allowable in the manufacture of the first barrel portion 41 and/or an angle error allowable in optical design.

FIG. 10 illustrates a state in which the first barrel portion 41 and the second barrel portion 42 are not fixed by screws in a state in which the first mirror 48, the second mirror 49, and the lens frame 52 of the second barrel portion 42 are detached. As illustrated in FIG. 10, the joint surface 58 of the first barrel portion 41 has a substantially rectangular shape, and female screws 65A, 65B, 65C, and 65D are provided at four corners of the joint surface 58. At four locations in the first joint portion 56 of the second barrel portion 42, insertion holes 61A, 61B, 61C (not illustrated), and 61D (not illustrated) are provided at positions corresponding to the female screws 65A, 65B, 65C, and 65D. It is possible to fix, that is, join the first barrel portion 41 and the second barrel portion 42 to each other with screws by causing the four female screws 65A to D and the four insertion holes 61A to D to face each other and causing four male screws 54A to D to engage with the female screws 65A to D, respectively.

Figure 11:
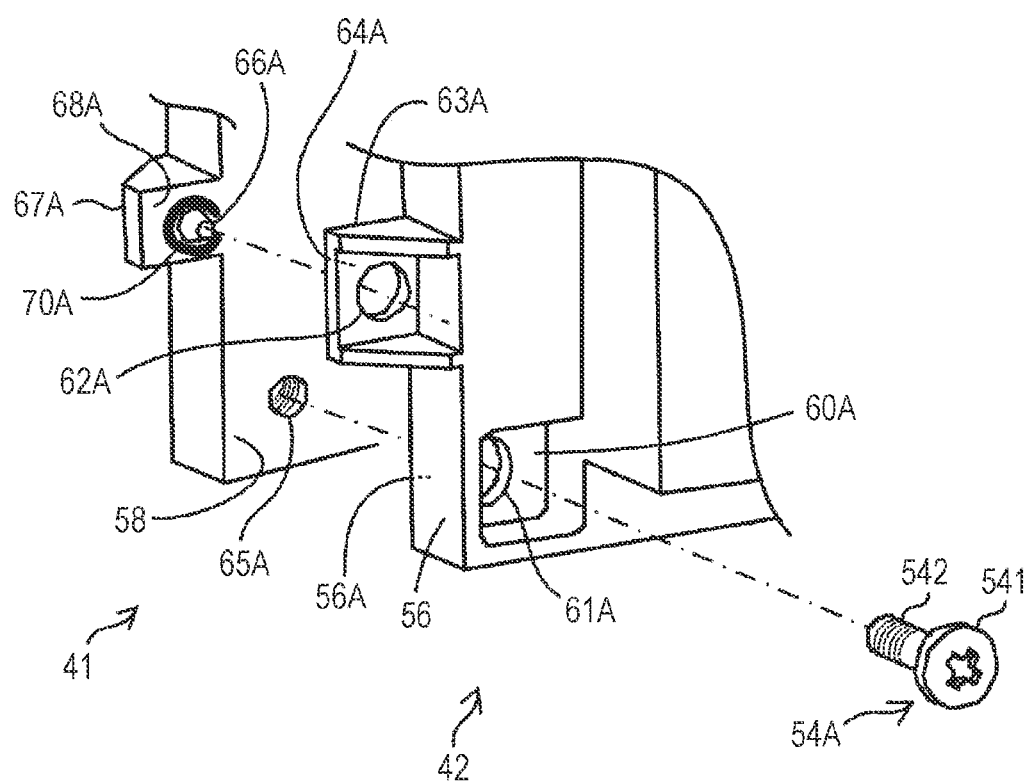
FIG. 11 is an enlarged perspective view of a joint part between a first barrel portion and a second barrel portion of a projection lens according to an embodiment.

Detailed description will be provided with reference to FIG. 11 in which the X part and the Y part indicated by ovals of dotted lines in FIG. 10 are enlarged. As illustrated in FIG. 11, the female screw 65A is provided at a lower left corner of the joint surface 58 of the first barrel portion 41. The first joint portion 56 of the second barrel portion 42 is provided with a concave section at a position corresponding to the female screw 65A, and the insertion hole 61A at a wall surface 60A of the concave section. With the joint surface 58 and the first contact surface 56A being in contact with each other such that the female screw 65A and the insertion hole 61A face each other, the male screw 54A is inserted into the insertion hole 61A from the side of the second barrel portion 42 to be engaged with the female screw 65A and can be fixed by screws.

The inner diameter of the insertion hole 61A is larger than the outer diameter of the female screw 65A. The outer diameter of the female screw 65A is a diameter corresponding to the outer diameter of a screw portion 542 of the male screw 54A. The inner diameter of the insertion hole 61A is increased to be larger than the outer diameter of the female screw 65A so that the position of the first mirror 48 of the second barrel portion 42 is adjustable with respect to the first optical axis A1. A dimensional difference between the inner diameter of the insertion hole 61A and the outer diameter of the female screw 65A in the radial direction is an adjustable amount of the position of the first mirror 48 with respect to the first optical axis A1. In the present example, both the insertion hole 61A and the female screw 65A are circular. It is thus possible to adjust the position of the second barrel portion 42 in all directions in a plane parallel to the joint surface 58.

Therefore, it is possible to shift the position of the first mirror 48 in the second direction, that is, the extension direction of the second optical axis A2, and the position of the first mirror 48 is adjustable by being shifted in the second direction. This makes it possible to adjust the position of the second barrel portion 42 in the second optical axis direction. An increased amount of the inner diameter of the insertion hole 61A can be determined in consideration of an error in the manufacture of the first barrel portion 41 and the second barrel portion 42, an error in assembly thereof, and/or an alignment error allowable in optical design, and the like. The outer diameter of a head portion 541 of the male screw 54A is larger than the inner diameter of the insertion hole 61A.

The insertion hole 61A may not have a circular shape and may be, for example, a long hole. In this case, for example, when the long-axis diameter of the insertion hole 61A is longer than the diameter of the female screw 65A while the short-axis diameter thereof is the same as the diameter of the female screw 65A, positional adjustment is possible only in the long-axis direction.

The above relationship is also established in the relationship between the insertion holes 61B, 61C, and 61D and the male screws 54B, 54C, and 54D. The female screws 65, the male screws 54, and the insertion holes 61 are collectively referred to as a second holding portion fixing mechanism. In this case, the fixing force of the second holding portion fixing mechanism is a fastening force with which the male screws are engaged with the female screws and fastened. Although the second holding portion fixing mechanism is not limited to a screw fixing mechanism, the use of screws eases an assembly step.

When the second barrel portion 42 is not completely fixed to the joint surface 58 of the first barrel portion 41 (for example, when screws are not completely fastened and are loose), the positions of the first optical axis A1 and the first mirror 48 are adjustable. That is, by weakening the fixing force of the second holding portion fixing mechanism, the second barrel portion 42 can be shifted with respect to the first barrel portion 41. Thus, it is possible to fix the second barrel portion 42 to the first barrel portion 41 after the relative positional relationship between the first optical system L1 and the first mirror 48 is adjusted.

Positional adjustment of the second barrel portion 42 and the adjustment of the position and the orientation of the second mirror 49 described with FIG. 6 can adjust the tangential surface and the sagittal surface that affect the astigmatism of the third optical system L3.

In the present example, a case in which, as the second holding portion fixing mechanism, the female screws 65 are formed at the first barrel portion 41 and the insertion holes 61 are formed at the second barrel portion 42 has been described. However, the female screws 65 may be formed at the second barrel portion 42 while the insertion holes 61 are formed at the first barrel portion 41 (not illustrated). In this case, the male screws 54 are inserted toward the second barrel portion 42 from the side of the first barrel portion 41 and are engaged with the female screws 65.

In the present example, the second holding portion fixing mechanism includes, in addition to the female screws 65, the male screws 54, and the insertion holes 61, an adhesive 70A that bonds the first barrel portion 41 and the second barrel portion 42 to each other. As illustrated in FIG. 11, the first barrel portion 41 includes a first projecting portion 67A. The first projecting portion 67A has a first adhesion surface 68A on the same plane as the joint surface 58. A projection 66A is formed at the first adhesion surface 68A.

The second barrel portion 42 includes a second projecting portion 63A at a position facing the first projecting portion 67A. The second projecting portion 63A has a second adhesion surface 64A that is the same plane as the first contact surface 56A. The second projecting portion 63A has a second insertion hole 62A. When the joint surface 58 and the first contact surface 56A are in contact with each other, the projection 66A is positioned at the second insertion hole 62A. In this state, the adhesive 70A is supplied through the second insertion hole 62A to the periphery of the projection 66A of the first adhesion surface 68A. The adhesive 70A spreads in the inner portion of the second insertion hole 62A and between the joint surface 58 and the first contact surface 56A and cures to bond the first barrel portion 41 and the second barrel portion 42 to each other. The type of the adhesive 70A is not limited. For example, a photocurable resin is used.

As illustrated in FIG. 10, first projecting portions 67B to D each having the same structure as the first projecting portion 67A are formed at the first barrel portion 41. Second projecting portions 63B to D (63C is not illustrated) each having the same structure as the second projecting portion 63A are formed at the second barrel portion 42. The first projecting portions 67B to D and the corresponding second projecting portions 63B to D are bonded to each other by an adhesive, similarly to the bonding between the first projecting portion 67A and the second projecting portion 63A. Due to fixing by the adhesive at the four locations, positional shifting of the joint surface 58 between the first barrel portion 41 and the second barrel portion 42 in an in-plane direction is suppressed, even when screws are slightly loosened due to an effect of vibration and the like.

Effects of the aforementioned configuration will be described below. In the manufacture of the projection lens 11, components, such as the holding frame 42A, are first manufactured. When the holding frame 42A is a resin-molded article obtained by using a mold, the manufacture is easy and productivity is high compared with when a metal material is used.

In the holding frame 42A, one of the pair of the first opening 101 and the second opening 102 and the pair of the third opening 103 and the fourth opening 104, facing each other on the front surface side and the back surface side, has a large opening area, and the other has a small opening area. Therefore, in a resin molding of the holding frame 42A with the use of a mold constituted by two molds, the molds are easily removed.

In a step of assembling the projection lens 11, for example, the first barrel portion 41 and the third barrel portion 43 are first assembled. The frame member of the first barrel portion 41 has a general cylindrical shape. The first optical system L1 is thus inserted through the opening on the incident side or on the emission side into the cylindrical frame member in the first optical axis A1 direction, and the first barrel portion 41 is assembled. The same applies to the third barrel portion 43.

In the assembly of the second barrel portion 42, first, the second optical system L2 is attached to the lens frame 52, and the lens unit 50 is assembled. After that, the lens unit 50 is attached to the holding frame 42A. The opening portion 95 having a size that enables insertion of the lens frame 52 (the lens unit 50) is provided at the back surface of the holding frame 42A, that is, in the emission-side direction of light having the first optical axis A1 in the outer peripheral surface of the holding frame 42A.

As illustrated in FIG. 7, the lens unit 50 is inserted through the opening portion 95 at the back surface of the holding frame 42A and is assembled to the holding frame 42A. The lens unit 50 is in contact with, of the inner surface of the holding frame 42A constituting the second barrel portion 42, the attachment surfaces 97 directed in a direction intersecting the second optical axis A2. In this state, the lens unit 50 is fixed by screws corresponding to the lens frame fixing mechanism. Therefore, freedom in the assembly direction is increased compared with when a lens is required to be inserted in an optical axis direction as with the first barrel portion 41 and the third barrel portion 43. As a result, when the frame member of the second barrel portion 42 corresponding to the second holding portion has a simple configuration, as with the holding frame 42A, it is possible to provide a projection lens in which assembly of the second optical system L2 with respect to the holding frame 42A is easy.

Since the holding frame 42A has the opening portion 95 having the size that enables insertion of the lens frame 52, the lens unit 50 can be attached to the holding frame 42A through the opening portion 95. Due to the holding frame 42A being thus provided with a configuration, such as the opening portion 95, for clarifying an assembly position of the lens unit 50, efficiency in the production of the second barrel portion 42 is improved.

The arrangement position of the first mirror 48 and the arrangement position of the lens unit 50 including the second optical system L2 do not overlap each other in the second direction in which the second optical axis A2 extends. Consequently, when the lens unit 50 is inserted through the opening portion 95 at the back surface of the holding frame 42A and assembled, the lens unit 50 and the first mirror 48 do not interfere with each other, even when the first mirror 48 has been previously attached. Therefore, assembly of the lens unit 50 from the back surface side of the holding frame 42A is enabled, and the assembly is easy.

After that, the first mirror 48 and the second mirror 49 are attached to the holding frame 42A. At this stage, the first mirror 48 and the second mirror 49 are temporarily fixed by screws. Consequently, temporary assembly of the second barrel portion 42 is completed.

Next, the second barrel portion 42 is assembled to the first barrel portion 41. As illustrated in FIG. 10, the holding frame 42A of the second barrel portion 42 corresponding to the second holding portion is fixed by screws or the like that is the second holding portion fixing mechanism in a state of being in contact with, of the outer peripheral surface of the first barrel portion 41 corresponding to the first holding portion, the joint surface 58, which is an end surface directed in the first B direction. As described above, the lens frame 52 is fixed by the screws in a state of being in contact with, of the inner surface of the holding frame 42A of the second barrel portion 42, the attachment surfaces 97A and 97B directed in the first B direction, as with the joint surface 58 of the first barrel portion 41.

As described above, the attachment direction of the second barrel portion 42 with respect to the first barrel portion 41 and the attachment direction of the lens frame 52 with respect to the holding frame 42A of the second barrel portion 42 are the same directions. Therefore, for example, when the second barrel portion 42 is attached to the first barrel portion 41 after the lens frame 52 is attached to the holding frame 42A, holding and moving of portions can be performed in the same direction. It is thus possible to simplify the assembly step.

Since screws are used, as an example, for fixing in the assembly of the second barrel portion 42 with respect to the first barrel portion 41, it is possible by weakening the fastening force, which is the fixing force, of the screws to shift the second barrel portion 42 with respect to the first barrel portion 41. It is thus possible to adjust the positions of the first optical system L1 and the first mirror 48.

In the present example, the adjustment direction is the all directions of the joint surface 58, including the second optical axis A2. Thus, the freedom in positional adjustment is high. Due to the use of screws in fixing, the fixing force is easily weakened, and positional adjustment is easy.

A distance of the first optical axis A1 between the most upstream lens L11 of the first optical system L1 and the first mirror 48 is longer than a distance of the second optical axis A2 between the first mirror 48 and the second mirror 49. Consequently, the second barrel portion 42 that houses the second optical system L2 has a small size and a small weight compared with the first barrel portion 41 that houses the first optical system L1. When having a small size and a small weight, the second barrel portion 42 is not easily bent, compared with when being large and heavy, in a case in which the rigidity of the material is the same. A force is applied to the second barrel portion 42 in positional adjustment with respect to the first barrel portion 41. It is thus possible by reducing the size and the weight of the second barrel portion 42 to suppress the second barrel portion 42 from being easily bent and to ensure favorable optical performance. In particular, in the present example, the frame member of the second barrel portion 42 is a resin-molded article like the holding frame 42A and has a simple configuration. In such a case, compared with when a metal frame member is used, the rigidity of the material itself is insufficient. Thus, it is highly required to suppress bending and distortion of the holding frame 42A by size and weight reductions.

In the projection lens 11, the second barrel portion 42 functions as a connecting part between the first barrel portion 41 and the third barrel portion 43. Thus, size and weight reductions of the second barrel portion 42 reduce the size and the weight of the entirety of the projection lens 11. Consequently, there is an advantage that the projection lens 11 is easily moved.

The second optical system L2 is preferably constituted, as with the present embodiment, by three or less lenses. This is because further reductions in the size and the weight of the second optical system L2 are enabled. The size and the weight of the lens unit 50 can be also reduced. Thus, even when the second optical system L2 is fixed to the inside surface (the attachment surfaces 97A and 97B) of the second barrel portion 42, the lens frame 52 is not easily bent. This also contributes to an improvement in the precision of assembly of the second optical system L2.

The first optical system L1 according to the present embodiment includes, on the upstream of the first mirror 48, the intermediate-image formation lens L14 that forms an intermediate image. The intermediate-image formation lens L14 included in the first optical system L1 provides the following advantages compared with when the intermediate-image formation lens is included on the downstream side of the first mirror 48.

First, the size and the weight of the second barrel portion 42 can be further reduced since there is no need to provide the second optical system L2 with an intermediate-image formation lens.

In addition, in the present example, the portions of the first barrel portion 41 and the second barrel portion 42 are adjustable. Provision of the intermediate-image formation lens in the first optical system L1 enables positional adjustment of the first optical axis A1 and the first mirror 48 in the second barrel portion 42. When the intermediate-image formation lens forms an intermediate image in the vicinity of the first mirror 48 in the second barrel portion 42, relative positions of the intermediate image and the first mirror 48 can be adjusted by adjusting the positions of the first barrel portion 41 and the second barrel portion 42. In the existing configuration presented in JP6378448B, an intermediate-image formation lens is disposed behind the first mirror 48, and the configuration has a position adjustment portion behind the intermediate-image formation lens. It is thus difficult to adjust relative positions of the first mirror 48 and an intermediate image, which disables sufficient adjustment of an optical axis. However, according to the present embodiment, such positional adjustment is possible.

Further, provision of the intermediate-image formation lens in the first optical system L1 enables a reduction in the diameter of a light flux incident on the first mirror 48. Consequently, a size reduction of the first mirror 48 is enabled. A size reduction of the first mirror 48 can reduce the size of the second barrel portion 42.

A method of adjusting the positions of the first barrel portion 41 and the second barrel portion 42 includes, for example, causing a test image for positional adjustment to be incident on the first optical axis A1 in a state in which the first joint portion 56 is in contact with the joint surface 58 as illustrated in FIG. 2 and projecting the test image on the screen 36. Positional adjustment is performed to optimize the projected image by moving the second barrel portion 42 with respect to the first barrel portion 41 in a direction parallel to the joint surface 58 with the use of a holding device while confirming the test image. The second barrel portion 42 is fixed by screws at a position that has been adjusted. The second barrel portion 42 is further bonded by the adhesive 70A.

The first mirror 48 and the second mirror 49 that have been temporarily fixed to the holding frame 42A are also subjected to positional adjustment. After being subjected to the positional adjustment, the first mirror 48 and the second mirror 49 are fixed by an adhesive.

After this, the cover portion 110 is fixed to the holding frame 42A by screws to complete the projection lens 11. The bending rigidity of the cover portion 110 is lower than the bending rigidity of the holding frame 42A. Thus, the cover portion 110 follows the bent ends of the holding frame 42A and can cover the holding frame 42A. When a force is applied to the second barrel portion 42, a stress generated between the cover portion 110 and the holding frame 42A is absorbed as a result of the cover portion 110 being distorted. Accordingly, no distortion is generated in the holding frame 42A, and an optical adverse effect on the first mirror 48, the second optical system L2, and the second mirror 49 held in the inner portion of the holding frame 42A is small.

The aforementioned embodiment has been described in a form in which, as the projection lens 11, the first barrel portion 41 corresponding to the first holding portion, the second barrel portion 42 corresponding to the second holding portion, and the third barrel portion 43 corresponding to the third holding portion are included. The third barrel portion 43 is, however, not necessarily included.

For the above embodiment, an example in which a DMD is used as the image formation panel 32 has been described. However, a transmission-type image formation panel that uses a LCD (Liquid Crystal Display) instead of a DMD may be used. Alternatively, a panel that uses a self-light-emission element, such as a LED (Light Emitting Diode) and/or an organic EL (Electro Luminescence), may be used. As the reflection portion, a mirror of a total reflective-type, instead of a specular reflection-type, may be used.

For the aforementioned embodiment, an example in which a laser light source is used as the light source 34 has been described. The embodiment is, however, not limited thereto, and may use a mercury lamp and/or a LED as the light source 34. In the aforementioned example, a blue laser light source and a yellow fluorescent body are used. The embodiment is, however, not limited thereto and may use a green fluorescent body and a red fluorescent body instead of the yellow fluorescent body. A green laser light source and a red laser light source may be used instead of the yellow fluorescent body.

In the present specification, "A and/or B" has the same meaning as "at least one of A or B". It means that "A and/or B" may be only A, may be only B, and may be a combination of A and B. In the present specification, the same way of thinking as with "A and/or B" is also applied when three or more things are described by being connected with "and/or".

All of the documents, the Patent Applications, and the technical standards described in the present specification are incorporated in the present specification by reference to the same extent as if it is described specifically and individually that each of the documents, the patent applications, and the technical standards is incorporated herein by reference.

What is claimed is:

1. A projection lens configured to be attached to a housing of a projection apparatus having an electro-optical element, the projection lens comprising:

a first holding portion that holds a first optical system disposed along a first optical axis through which light from the housing passes;

a first reflection portion that bends light having the first optical axis into light having a second optical axis;

a second holding portion that holds the first reflection portion; and a second holding portion fixing mechanism that fixes the second holding portion to the first holding portion, wherein, by weakening a fixing force of the second holding portion fixing mechanism, the second holding portion can be shifted relative to the first holding portion; and wherein the second holding portion comprises a second reflection portion that bends light having the second optical axis into light having a third optical axis, a distance of the first optical axis between a most upstream lens of the first optical system and the first reflection portion being longer than a distance of the second optical axis between the first reflection portion and the second reflection portion.

2. The projection lens according to claim 1, wherein second holding portion is capable of being shifted with respect to the first holding portion in an extension direction of the second optical axis.

3. The projection lens according to claim 2, wherein the second holding portion fixing mechanism fixes the second holding portion to a surface among outer peripheral surfaces of the first holding portion, the surface being parallel to a surface intersecting the first optical axis.

4. The projection lens according to claim 2, wherein the first optical system comprises an intermediate-image formation lens that is on an upstream side of the first reflection portion and that forms an intermediate image.

5. The projection lens according to claim 1,
wherein the second holding portion fixing mechanism comprises a male screw, a female screw that engages with the male screw, and an insertion hole through which the male screw is inserted, and
wherein the male screw is formed in one of the first holding portion or the second holding portion, and the insertion hole is formed in another of the first holding portion or the second holding portion.

6. The projection lens according to claim 2,
wherein the second holding portion fixing mechanism comprises a male screw, a female screw that engages with the male screw, and an insertion hole through which the male screw is inserted, and
wherein the male screw is formed in one of the first holding portion or the second holding portion, and the insertion hole is formed in another of the first holding portion or the second holding portion.

7. The projection lens according to claim 5, wherein the second holding portion fixing mechanism fixes the second holding portion to a surface among outer peripheral surfaces of the first holding portion, the surface being parallel to a surface intersecting the first optical axis.

8. The projection lens according to claim 5, wherein the first optical system comprises an intermediate-image formation lens that is on an upstream side of the first reflection portion and that forms an intermediate image.

9. The projection lens according to claim 1, wherein the second holding portion fixing mechanism fixes the second holding portion to a surface among outer peripheral surfaces of the first holding portion, the surface being parallel to a surface intersecting the first optical axis.

10. The projection lens according to claim 1, wherein the first optical system comprises an intermediate-image formation lens that is on an upstream side of the first reflection portion and that forms an intermediate image.

11. The projection lens according to claim 10, wherein the intermediate image is formed at the second holding portion.

12. The projection lens according to claim 1, wherein the second holding portion fixing mechanism includes an adhesive that adheres the second holding portion to the first holding portion.

13. The projection lens according to claim 1, wherein the second holding portion has a holding frame that integrally holds the first reflection portion and the second reflection portion, the holding frame being a resin molded article.

14. The projection lens according to claim 13, wherein an outer peripheral surface of the holding frame has an opening portion in an emission-side direction of light having the first optical axis.

15. The projection lens according to claim 1,
wherein the second holding portion comprises a lens frame fixing mechanism that fixes a lens frame that holds a second optical system disposed along the second optical axis in the second holding portion,
wherein the first optical axis extends in a first direction having a first A direction that is a light incident side and a first B direction that is a light emission side,
wherein the second holding portion is fixed by the second holding portion fixing mechanism to, of outer peripheral surfaces of the first holding portion, an end surface directed in the first B direction, and
wherein the lens frame is fixed by the lens frame fixing mechanism to, of inner surfaces of the second holding portion, a surface directed in the first B direction as with the end surface.

16. A projection apparatus comprising: the projection lens according to claim 1; the electro-optical element; and the housing.

* * * * *